United States Patent Office 2,927,086
Patented Mar. 1, 1960

2,927,086

ALKYLATION PROCESS AND CATALYST

Leon B. Gordon and Truman P. Moote, Jr., Tulsa, Okla., assignors to Pan American Petroleum Corporation, Tulsa, Okla., a corporation of Delaware No Drawing. Application March 27, 1958
Serial No. 724,239

23 Claims. (Cl. 252—429)

The present invention relates to an improved method of alkylation. More particularly it is concerned with a highly active alkylation catalyst which makes possible the alkylation of aromatic and certain aliphatic hydrocarbons under mild conditions.

Specifically, we have found that certain silicon and tin compounds, when combined with various organometallic compounds, hydrocarbon derivatives of boron or complex metal hydrides, function as excellent alkylation catalysts under mild temperature conditions. Thus, in practice, we are able to effect alkylation reactions with such catalysts at initial temperatures as low as from about 25° to about 80° C. In most instances in which we have employed these catalysts, maximum temperatures, not substantially in excess of 200° C., have been required. Ordinarily, we prefer reaction temperatures in the range of from about 100° to 150° C. Under these general operating conditions, we have obtained high yields of alkylated materials.

In the alkylation of an aromatic hydrocarbon having a side chain with a primary olefin or with a diolefin, using an alkali metal or alkali metal hydride catalyst, the olefin attaches to the side chain and not to the ring. In contrast, alkylations made using Lewis acid type catalysts result in the olefin attaching itself to the aromatic ring. Examples of catalysts capable of alkylating the aromatic nucleus are aluminum chloride-hydrogen chloride, silicophosphoric acid, hydrogen fluoride, silica-alumina (at elevated temperatures, i.e., typically 450° C.), zinc chloride on alumina, activated hydrosilicates and alkanesulfonic acids.

In carrying out our invention, the aliphatic or aromatic hydrocarbon to be alkylated, together with a suitable silicon or tin compound and the organometallic compound or complex metal hydride, are added to a reaction vessel in an inert atmosphere such as nitrogen, if desired. The order in which the hydrocarbon and catalyst compounds are added, as far as we are able to determine, is unimportant. After these ingredients are well mixed, the alkylating agent is introduced and the vessel placed under a substantial pressure. The mixture is next slowly heated up to a temperature of from about 50° to about 100° C., preferably 70° to about 90° C., and the reaction continued until it appears to be complete. If the alkylating olefin is in a gaseous state, completion of the reaction may be evidenced by the failure of the pressure to drop further.

The products from this reaction are generally liquids and may be recovered by first cooling the reaction vessel and then water-washing the contents of the flask to decompose the catalyst and allow the decomposition products, along with water-soluble impurities, to pass into the lower water layer. The upper organic product layer is separated, filtered if necessary, and then dried by means of any of several methods known to the art. The dried product may then be fractionated. Alternatively, the product can be distilled to recover unreacted aromatic hydrocarbon and volatile catalyst components such as silicon or tin tetrachlorides. The residue can be filtered to separate reaction product from solid and less volatile liquid catalyst components.

While we have found that reaction mixtures in the alkylation process, as generally described above, should first be heated to about 50° to 100° C., lower or higher temperatures may, in some instances, be required to initiate the reaction.

Generally speaking, the preferred form in which silicon is used in carrying out our invention, is the tetrachloride. However, other tetrahalides such as the tetraiodide and tetrabromide, may be employed. In addition, various hydrocarbon derivatives of silicon, may be substituted for the silicon tetrahalides mentioned above. As examples of such derivatives, there may be mentioned dimethyl dibromosilane, dimethyl dichlorosilane, phenyl methyl dichlorosilane, diphenyl dichlorosilane, tetramethyl silane, trimethyl bromosilane, and the like.

When tin compounds are used in the process of our invention in place of silicon-containing materials, we prefer to use a tetrahalide of tin such as, for example, tin tetrachloride, although the tetraiodide or tetrabromide may also be employed. Likewise the halides of tin in divalent state such as stannous chloride, may be used. In addition, various hydrocarbon derivatives of tin may be substituted for the tin halides mentioned above. As examples of such derivatives, there may be mentioned dimethyl dibromostannane, dimethyl dichlorostannane, phenyl methyl dichlorostannane, diphenyl dichlorostannane, tetramethyl stannane, trimethyl bromostannane, tetraphenyl tin, and the like.

As examples of the organometallic compounds suitable for use in combination with the aforesaid tin or silicon compounds, there may be mentioned those derived from metals of groups IA to IIIA and IIB of the Periodic Chart of the Elements. Organic derivatives of the following metals may be used in preparing the catalyst employed in the process of our invention: Li, Na, K, Rb, Mg, Ca, Zn, Al, Ga, In, Tl or mixtures of such derivatives. Typical of such compounds are $NaAl(C_3H_7)H_3$, $Zn(C_2H_5)_2$, $LiC_4H_9$, $C_2H_5MgI$, phenyl magnesium bromide, $C_4H_9ZnI$, $LiAl(C_2H_5)H_3$, organoaluminum compounds such as the trialkylaluminums, the triarylaluminums, preferably the lower molecular weight derivatives such as triisobutylaluminum, triethylaluminum, triamylaluminum, and the like.

The metal hydrides which may be substituted for the above-mentioned compounds comprise the aluminum or borohydrides. Typical examples of these compounds are $NaAlH_4$, $LiBH_4$, $NaBH_4$, $LiAlH_4$ together with complex hydrides such as $NaAl(C_3H_7)H_3$ mentioned in the paragraph immediately above.

Hydrocarbon derivatives of boron which may be used in practicing our invention, include the alkyl borons and the aryl borons. Examples of such compounds are trimethyl boron, triethyl boron, tributyl boron, tridecyl boron, and the like. Typical of the aryl borons that may be employed are triphenyl boron, tritolyl boron, trixylyl boron, trinaphthyl boron, and the like.

The proportions in which the silicon or tin compounds (hereinafter sometimes referred to as the first component of the catalyst) and the organometallic compound or complex metal hydride (hereinafter sometimes referred to as the second component) are used, may vary over a relatively wide range of concentrations. In fact, insofar as we have been able to determine, the proportions of the catalyst components are not believed to be critical. Typically, the first and second components may be used in respective molar proportions of from 100:1 to 1:100. Ordinarily the preferred ratios may range from about 10:1 to about 1:10, and we have found it particularly advantageous to use molar ratios of about 5:1. The quantities of reactants used may be likewise varied over a relatively wide range with good results. For example, from about 0.1 to 10 mols of alkylating agent per mol of alkylatable hydrocarbon, may be used. Preferably a ratio of from about 0.3 to about 3 mols of alkylating agent per mol of aromatic hydrocarbon should be maintained. An excess of aromatic hydrocarbon to alkylating agent enhances the formation of monoalkylated product. To produce the monoalkylated material, the mol ratio of alkylating agent to alkylatable hydrocarbon should be about 1:10 and preferably about 1:2 or 3. For dialkylation these ratios should be reversed.

The pressure employed in carrying out our invention may vary widely. Alkylation with the less volatile olefins and in some cases even with volatile olefins may be effected at atmospheric pressure, if desired. With gaseous olefins or with normally gaseous or low boiling isoparaffins, it is generally preferred to use superatmospheric pressure in order to provide an adequate concentration of reactants to contact the catalyst under reaction conditions. In general, alkylation of aromatics and isoparaffins, in accordance with our invention, may be effected with pressures ranging from atmospheric to 500 p.s.i.g. and above.

While our invention may be carried out by bringing into contact the catalyst, alkylating agent and alkylatable hydrocarbon, with one or both of the reactants in the gaseous or vapor phase, we ordinarily prefer that at least one of the reactants be in the liquid phase.

The alkylating agents used in our invention may be selected from a wide variety of compounds. In fact, various of the well-known diolefins have been found to be operative. Examples of these alkylating agents are ethylene, propylene, 1-butene, styrene, alpha methyl styrene, butadiene, the pentadienes, such as, for example, isoprene, and the like. Although it is normally desirable to use the alkylating agent in substantially pure form, various mixtures thereof or streams containing various inert diluents along with a suitable alkylating agent, may be employed. For example, the crude product stream from the dehydrogenation of a normally gaseous paraffin hydrocarbon, may be used directly in the process of our invention. Likewise, refinery fractions of ethylene, propylene, 1-butene or mixtures of such fractions, may be used if desired.

As examples of alkylatable hydrocarbons that can be used in carrying out our invention, there may be mentioned toluene, benzene, ethyl benzene, the xylenes, naphthalene, diphenyl, anthracene, isoparaffins, such as isobutane, isopentane, and the like. Mixtures of these hydrocarbons, of course, may be alkylated by our invention as presently contemplated.

Aromatic hydrocarbons are readily alkylated with unsaturated hydrocarbons of the type contemplated herein, in the presence of a catalyst consisting of a silicon or tin compound of the class mentioned above and said second component at pressures ranging from atmospheric to 50 to 70 p.s.i.g. and at about 100° C. or less. When the alkylating agent is employed in a ratio of about 1 mol for each 2 or 3 mols of aromatic hydrocarbon, the formation of a monoalkylated product is favored. Propylene, for example, when reacted with toluene under such conditions, is used up practically completely with the major product frequently being a mixture of isomeric cymenes.

The process of our invention may be further illustrated by the following specific examples:

*Example 1*

A mixture consisting of 4 grams of triisobutylaluminum, 9 grams of silicon tetrachloride and 43 grams of toluene, was added to a 100 ml. glass flask and subjected to a propylene pressure of 68 p.s.i.g. The reaction was continued for four hours, during which time the maximum temperature was 127° C. Thereafter the reaction mixture was cooled and the contents washed with water. The product was recovered and when subjected to infrared analysis, indicated the presence of cymene, predominantly the ortho and para isomers, together with a small amount of toluene.

*Example 2*

A mixture consisting of 2 grams of triisobutylaluminum and 6 grams of dimethyl dichlorosilane, was added to 43 grams of toluene contained in a 100 ml. glass flask, and thereafter subjected to a propylene pressure of 50 p.s.i.g. The flask was heated up to about 115° C., at which point the reaction was initiated with a maximum temperature of 150° C. being recorded. Reaction was continued for a period of two hours, after which the resulting mixture was cooled and the contents washed with water. The recovered product was then subjected to infrared analysis, which indicated the presence of ortho, meta and para symenes.

*Example 3*

A mixture consisting of 3.3 grams of ethyl magnesium bromide and 8.8 grams of silicon tetrachloride, was added to 43 grams of toluene contained in a 100 ml. glass flask, and thereafter subjected to a propylene pressure of 70 p.s.i.g. The flask was heated up to about 123° C., at which point the reaction was initiated with a maximum temperature of 132° C. being recorded. Reaction was continued for a period of one and a quarter hours, after which the resulting mixture was cooled and the contents washed with water. The recovered product was then subjected to infrared analysis, which indicated the presence of ortho, meta and para cymenes.

*Example 4*

A mixture consisting of 1 gram of lithium aluminum hydride and 8.8 grams of silicon tetrachloride, was added to 43 grams of toluene contained in a 100 ml. flask and thereafter subjected to a propylene pressure of 60 p.s.i.g. The flask was heated up to about 120° C. and the reaction initiated. When the reaction was discontinued, the crude product was worked-up in the manner previously described and thereafter subjected to infrared analysis which indicated the presence of ortho, meta and para cymenes.

*Example 5*

Into a 100 ml. flask containing 60 grams of toluene, was added a mixture of 4.5 grams of ethyl magnesium bromide in 40 grams of heptane, and 13.4 grams of tin tetrachloride. This mixture was next subjected to a propylene pressure of 70 p.s.i.g. and heated up to about 120° C. During a reaction period of eight hours, a maximum temperature ranging from 120°–160° C. was reached. Thereafter the flask and contents were cooled and the crude product washed with water. The resulting organic layer was recovered. Infrared analysis thereof showed the presence of ortho, meta and para cymenes.

*Example 6*

Into a 100 ml. flask containing 43 grams of toluene, was added a mixture of 0.5 gram of lithium aluminum hydride in 40 grams of heptane and 8.8 grams of tin tetrachloride. This mixture was next subjected to a propylene pressure of 50 p.s.i.g. Under these conditions the reaction was initiated spontaneously and in nine minutes time the temperature had increased to 158° C. After twenty minutes, the reaction was discontinued, the product recovered and worked-up as before. Infrared analysis showed some toluene to be present, however, the material consisted primarily of meta and para cymenes, together with 3, 5-diisopropyltoluene.

*Example 7*

Into a 100 ml. flask was first added 30 grams of naphthalene dissolved in 30 grams of heptane. To this solution was next added 6.7 grams of tin tetrachloride. On addition of the latter, the mixture turned a distinct yellow color. Thereafter, 1 gram of triisobutylaluminum was introduced causing the mixture to turn dark orange in color. Butadiene was next introduced in an amount sufficient to produce a pressure of 5 p.s.i.g. Reaction occurred immediately on the introduction of butadiene and the temperature rose from 32° to 95° C. within about three minutes. During this period, butadiene was continuously introduced at a rate such as to keep the pressure at about 5 p.s.i.g. Butadiene introduction was increased to produce a total system pressure of 18 p.s.i.g. and within about eight minutes, the reaction mixture temperature had increased to 106° C. For an additional nineteen minutes, butadiene was bled into the reaction mixture at a rate sufficient to maintain a constant pressure of about 18 p.s.i.g. At the end of this period, introduction of butadiene was discontinued. No heat was added at any time during the run. At the conclusion, the reaction product was recovered in the manner previously described and subjected to infrared analysis, which indicated the presence of butenyl naphthalene and a butenyl polymer with a terminal double bond.

In accordance with the procedure used in the foregoing examples, both tin tetrachloride and silicon tetrachloride were used in individual runs to determine the ability of these materials by themselves to function as alkylation catalyst. In neither instance was it determined that tin tetrachloride nor silicon tetrachloride functions as an alkylation catalyst under the conditions described herein.

In the present description and claims, the expression "alkylatable hydrocarbon" is intended to be restricted to the class of hydrocarbons enumerated herein.

As used in the present claims, the term "unsaturated hydrocarbon'" is intended to be limited to both mono- and diolefins of the classes mentioned herein.

While the compositions generally discussed in the foregoing description all function as alkylation catalysts, we ordinarily prefer those in which the first component thereof is in the form of a tin or silicon tetrachloride and the second component is a trialkylaluminum such as, for example, triisobutylaluminum.

We claim:

1. In a process for the alkylation of hydrocarbons, the improvement which comprises contacting an alkylatable hydrocarbon with an unsaturated hydrocarbon selected from the group consisting of mono- and diolefins in the presence of a catalyst comprising a first component selected from the group consisting of a tin halide, a silicon tetrahalide and a hydrocarbon derivative of silicon, and a second component selected from the group consisting of an alkali metal hydride of boron and an alkali metal hydride of aluminum, a hydrocarbon derivative of boron, and an organometallic compound derived from a metal selected from the group consisting of groups IA to IIIA and IIB of the Periodic Chart of the Elements.

2. In a process for the alkylation of an aromatic hydrocarbon, the improvement which comprises contacting said aromatic hydrocarbon with an unsaturated hydrocarbon in the presence of a catalyst comprising a tin halide and a complex alkali metal hydride containing an element of group IIIA of the Periodic Chart of the Elements.

3. In a process for the alkylation of an aromatic hydrocarbon, the improvement which comprises contacting said aromatic hydrocarbon with a diolefin in the presence of a catalyst comprising a tin halide and a complex alkali metal hydride containing an element of group IIIA of the Periodic Chart of the Elements.

4. The process of claim 2 in which the tin halide is tin tetrachloride.

5. In a process for the alkylation of an aromatic hydrocarbon, the improvement which comprises contacting said aromatic hydrocarbon with an olefin in the presence of a catalyst comprising a tin halide and an organometallic compound derived from a metal of groups IA to IIIA of the Periodic Chart of the Elements.

6. The process of claim 5 in which the organometallic compound is a trialkylaluminum.

7. The process of claim 6 in which the trialkylaluminum is triisobutylaluminum.

8. In a process for the alkylation of an aromatic hydrocarbon, the improvement which comprises contacting said aromatic hydrocarbon with an alkylating agent in the presence of a catalyst comprising silicon tetrachloride and an organometallic compound derived from a metal of groups IA to IIIA of the Periodic Chart of the Elements.

9. In a process for the alkylation of an aromatic hydrocarbon, the improvement which comprises contacting said aromatic hydrocarbon with an alkylating agent in the presence of a catalyst comprising silicon tetrachloride and a complex metal hydride containing an element of group IIIA of the Periodic Chart of the Elements.

10. The process of claim 8 in which the organometallic compound is a trialkylaluminum.

11. In a process for the alkylation of an aromatic hydrocarbon, the improvement which comprises contacting said aromatic hydrocarbon with an alkylating agent in the presence of a catalyst comprising a hydrocarbon derivative of silicon and an organometallic compound derived from a metal of group IA to IIIA of the Periodic Chart of the Elements.

12. The process of claim 11 in which the organometallic compound is a trialkylaluminum.

13. The process of claim 8 in which the alkylating agent is an olefin of not more than five carbon atoms and the organometallic compound is a trialkylaluminum.

14. The process of claim 9 in which the alkylating agent is an olefin and the hydride is an alkali metal aluminum hydride.

15. An alkylation catalyst consisting essentially of and having as its active ingredients a first component selected from the group consisting of a silicon tetrahalide and a hydrocarbon derivative of silicon, and second component selected from the group consisting of an alkali metal hydride of boron and an alkali metal hydride of aluminum, a hydrocarbon derivative of boron, and an organometallic compound derived from a metal selected from the group consisting of groups IA to IIIA and IIB of the Periodic Chart of the Elements.

16. An alkylation catalyst consisting essentially of and having as its active components silicon tetrachloride and an organometallic compound derived from a metal of groups IA to IIIA of the Periodic Chart of the Elements.

17. The catalyst of claim 16 in which the organometallic compound is a trialkylaluminum.

18. An alkylation catalyst consisting essentially of and having as its active components silicon tetrachloride and a complex alkali metal hydride containing an element of group IIIA of the Periodic Chart of the Elements.

19. The catalyst of claim 18 in which the complex metal hydride is lithium aluminum hydride.

20. The catalyst of claim 17 in which the trialkylaluminum is triisobutylaluminum.

21. The process of claim 1 in which said first and second components are employed in a molar ratio ranging from about 10:1 to about 1:10 respectively, and the reaction is effected at a temperature ranging from about 25° to about 200° C.

22. The alkylation catalyst of claim 15 in which the molar ratio of said first and second components ranges from about 100:1 to about 1:100 respectively.

23. The alkylation catalyst of claim 15 in which the molar ratio of said first and second components ranges from about 10:1 to about 1:10 respectively.

References Cited in the file of this patent

UNITED STATES PATENTS

| | | |
|---|---|---|
| 2,292,708 | Mavity | Aug. 11, 1942 |
| 2,441,214 | Thomas et al. | May 11, 1948 |
| 2,771,495 | Pines et al. | Nov. 20, 1956 |
| 2,780,660 | Field et al. | Feb. 5, 1957 |